United States Patent
Carnazza et al.

(10) Patent No.: US 7,466,809 B2
(45) Date of Patent: *Dec. 16, 2008

(54) SYSTEM AND METHOD FOR DYNAMICALLY ROUTING COMMUNICATIONS

(75) Inventors: James M. Carnazza, Rumson, NJ (US); Arun Guha, Lakewood, NJ (US); Douglas M. Nortz, Red Bank, NJ (US); Russell P. Sharples, East Windsor, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/694,324

(22) Filed: Mar. 30, 2007

(65) Prior Publication Data

US 2007/0189489 A1      Aug. 16, 2007

Related U.S. Application Data

(63) Continuation of application No. 10/212,946, filed on Aug. 6, 2002, now Pat. No. 7,203,294.

(51) Int. Cl.
*H04M 1/56* (2006.01)
(52) U.S. Cl. .............................. 379/142.07; 379/88.23; 379/201.02; 379/211.01
(58) Field of Classification Search ............ 379/142.07, 379/390.01, 88.02, 93.09, 265.09, 88.23, 379/201.02, 211.01
See application file for complete search history.

(56) References Cited

U.S. PATENT DOCUMENTS

| | | | |
|---|---|---|---|
| 4,277,649 A | 7/1981 | Sheinbein | |
| 4,310,727 A | 1/1982 | Lawser | |
| 4,313,035 A | 1/1982 | Jordan | |
| 5,029,196 A | 7/1991 | Morganstein | |
| 5,384,831 A | 1/1995 | Creswell et al. | |
| 5,430,791 A | 7/1995 | Feit et al. | |
| 5,473,681 A | 12/1995 | Partridge, III | |
| 5,548,636 A * | 8/1996 | Bannister et al. | 379/390.01 |
| 5,553,129 A | 9/1996 | Partridge, III | |
| 5,615,253 A | 3/1997 | Kocan et al. | |
| 5,737,403 A | 4/1998 | Zave | |
| 5,805,587 A | 9/1998 | Norris et al. | |
| 5,822,416 A | 10/1998 | Goodacre et al. | |
| 5,905,959 A | 5/1999 | Foladare et al. | |
| 6,141,545 A | 10/2000 | Begeja et al. | |
| 6,161,134 A | 12/2000 | Wang et al. | |
| 6,216,158 B1 | 4/2001 | Luo et al. | |
| 6,252,952 B1 | 6/2001 | Kung et al. | |
| 6,285,750 B1 | 9/2001 | Brachman et al. | |

(Continued)

*Primary Examiner*—Gerald Gauthier

(57) ABSTRACT

A system and method for routing an incoming call to a subscriber-selected destination number in accordance with dynamic data concerning the subscriber provided by an address book, a calendar and a presence server. A routing system routes the incoming call in accordance with a subscriber-defined routing rule associated with the originating number of the incoming call, as determined from the address book. The routing rule may specify that the incoming call be routed to a destination number associated with the current date and time, as indicated by the calendar. The routing rule may specify, alternatively or in addition thereto, that the incoming call be routed to a destination number associated with a presence-enabled service on which the subscriber is currently active. The subscriber or caller may also be alternatively notified of the routing of the incoming call.

20 Claims, 7 Drawing Sheets

U.S. PATENT DOCUMENTS

| | | | |
|---|---|---|---|
| 6,298,122 B1 * | 10/2001 | Horne | 379/93.09 |
| 6,404,868 B1 | 6/2002 | Beamish et al. | |
| 6,442,264 B1 | 8/2002 | Sutter | |
| 6,574,318 B1 | 6/2003 | Cannon et al. | |
| 6,829,349 B1 * | 12/2004 | Neale et al. | 379/265.09 |
| 6,879,676 B1 | 4/2005 | Contractor | |
| 7,027,566 B2 * | 4/2006 | Bossemeyer et al. | 379/88.02 |
| 2004/0202301 A1 | 10/2004 | Elliott | |

* cited by examiner

| Client | Phone Number | Present at address? |
|---|---|---|
| Client Instance 1 | 212-354-8678 | No |
| Client Instance 2 | 718-465-1388 | Yes |
| Client Instance 3 | 212-356-4568 | No |

Fig. 4

SYSTEM AND METHOD FOR DYNAMICALLY ROUTING COMMUNICATIONS

CROSS REFERENCE TO RELATED APPLICATIONS

This application is a continuation of U.S. patent application Ser. No. 10/212,946 filed Aug. 6, 2002, which will issue as U.S. Pat. No. 7,203,294 on Apr. 10, 2007; said patent application is incorporated herein by reference in its entirety.

FIELD OF INVENTION

The invention generally relates to a system and method for call forwarding, and more particularly to network-based call forwarding according to dynamic information concerning a subscriber stored in an address book, calendar, or presence database.

BACKGROUND OF THE INVENTION

Communication is critical in both business and personal aspects of life. With the advent of the Internet and cellular networks, a variety of ways to communicate are available, such as use of cellular phones, pagers, emails, instant messages, facsimile machines, voicemail systems, and traditional telephones. Today's typical telecommunications subscriber has access to and frequently utilizes a number, if not all, of these methods to both transmit and receive communications. Currently available call forwarding services attempt to direct high-priority communications to high-priority destinations such as cell phones. These call forwarding systems allow a subscriber to input information regarding a current location (e.g., a particular telephone at a location, such as an office phone or a conference room phone), thereby allowing incoming calls to be routed to that current location. However, these conventional call forwarding systems only operate within an interoffice switchboard such that employees of a particular company are the only possible users of the call forwarding system.

Other conventional call forwarding systems available to the public on the Public Switched Telephone Network (PSTN) are similarly unsophisticated and non-dynamic. One typical call forwarding system over the PSTN alerts a subscriber telephone station connected to the Internet of a waiting call via the Internet connection. The waiting call is forwarded via the PSTN to a services platform, which, in turn, establishes a connection to the subscriber using the Internet. The services platform then notifies the subscriber of the waiting call via the Internet connection and, responsive to a choice by the subscriber, may forward the telephone call to the subscriber via the Internet without interrupting the subscriber's Internet connection. However, in this limited system, call forwarding is only triggered by a busy/no answer signal, and the waiting call only forwarded to the destination where the Internet connection is established. Such a limited system also does not provide a mechanism for submitting dynamic instructions for the forwarding of waiting calls.

SUMMARY OF THE INVENTION

A system and method for dynamic selective call forwarding over the PSTN network is provided, by which a communication can be sent to one or more destination phone numbers depending on subscriber-defined instructions. The dynamic selective call forwarding system first identifies an incoming call as being directed to a subscriber of the system based on the dialed telephone number. The originating telephone number of the incoming call is also determined. A routing rule which is associated with the originating number is determined and the incoming call is routed in accordance with the routing rule. The routing is performed dynamically based on the subscriber's present location, using location information provided by the subscriber and/or determined by the system.

The invention has numerous advantages, providing dynamic and flexible routing of incoming calls and permitting incoming calls from the same originating number to be routed to different destination numbers depending on date and time, the present location of the subscriber, and/or other selectable factors. Advantageously, the dynamic selective call forwarding system is implemented over the PSTN and thus functions continuously. Other and further advantages will be apparent to those of skill in the art during the course of the following description with reference to the attached drawings.

BRIEF DESCRIPTION OF DRAWINGS

FIG. 4 is a table illustrating an exemplary presence sever database;

DETAILED DESCRIPTION OF THE DRAWINGS

Figure 1:
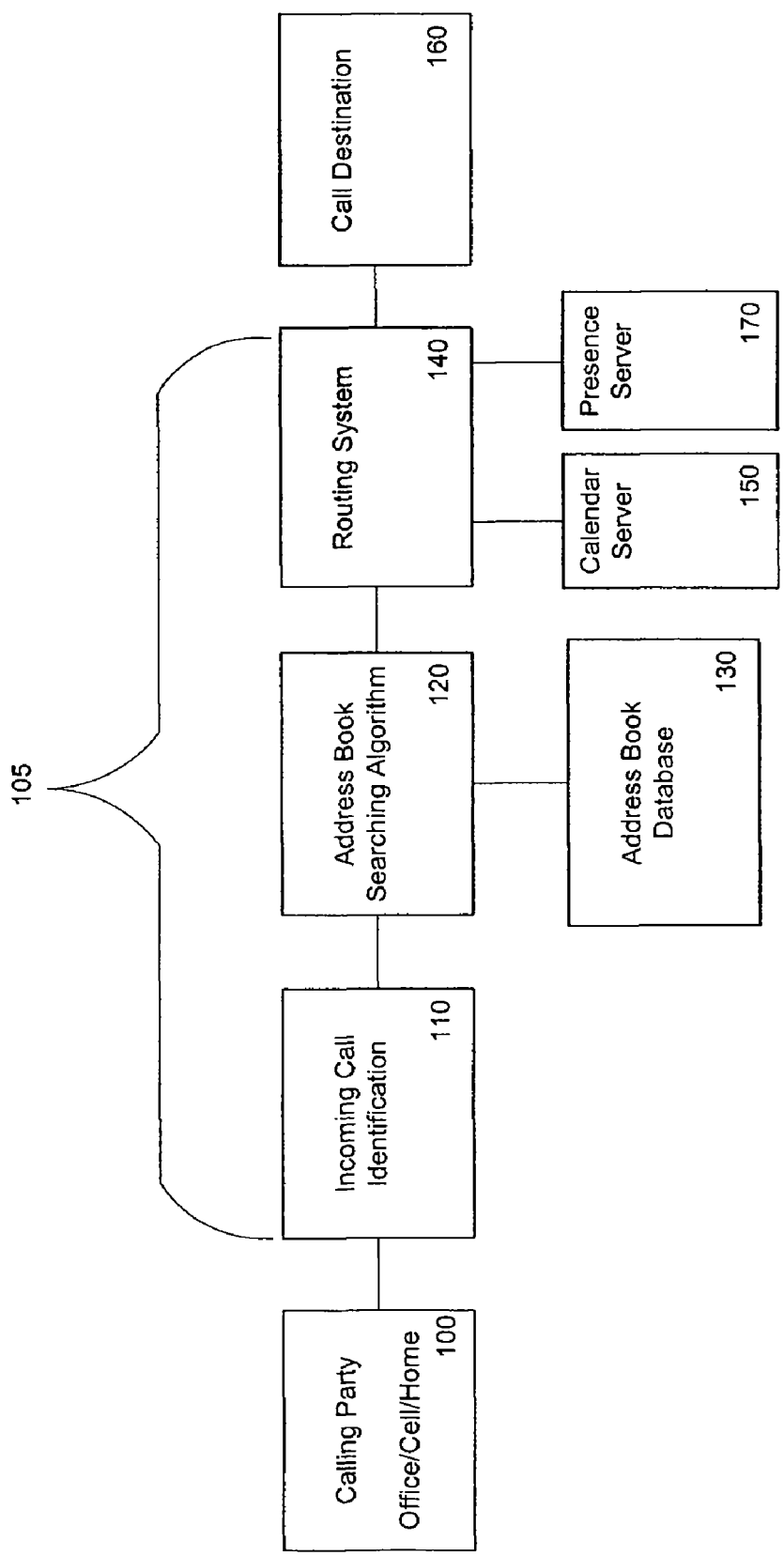
FIG. 1 is a block diagram illustrating an embodiment of the invention.

FIG. 1 is a block diagram illustrating an exemplary embodiment of the invention, which efficiently directs incoming communications so high priority communications reach a subscriber immediately, while lower priority communications are directed otherwise. For instance, the system enables important calls from family members or select business associates to be directed to the subscriber's cellular phone, while calls from unknown persons, such as telemarketers, are directed to voicemail. The dynamic selective call forwarding system 105 may be incorporated into the Public Switched Telephone Network (PSTN) as an adjunct to any switch. As indicated by block 100, a calling party initiates a call to a subscriber of the dynamic selective call forwarding service. The call may be initiated from any of a number of different locations associated with the caller. For example, in FIG. 1, the calling party may initiate the call from an office phone, a cell phone, or a home phone.

The call is received at incoming call identification module 110 of the dynamic selective call forwarding system 105. The incoming call identification module determines both the originating telephone number and the destination telephone number associated with the incoming call. If the destination telephone number is identified as not belonging to a subscriber of the dynamic selective call forwarding service, the call is routed to the destination telephone number by reinserting the call back into the PSTN and letting the call complete in a conventional manner. If the destination telephone number is identified as belonging to a subscriber, the incoming call is processed further according to the method of the invention. Alternatively, the PSTN could direct only those calls to a subscriber of the dynamic selective call forwarding system to the system for further processing. For purposes of illustration, the call in FIG. 1 is directed to a subscriber.

Having identified the call as being directed to a subscriber, the subscriber's entry in an address book database is retrieved by address book searching algorithm 120, which is in communication with the incoming call identification module. (The term "address book database" is used merely for convenience of illustration. The address book database need not contain addresses nor be associated with an address book feature but, for operation beyond mere default operation, must include a telephone number and a routing rule for an incoming call associated with the telephone number.) The searching algorithm compares the originating number to one or more telephone numbers for the subscriber's contacts stored in the address book database 130 to retrieve an associated routing rule. The address book database is structured so that each record in the database has one or more incoming telephone numbers and subscriber-defined routing rules associated therewith. In addition, each routing rule may contain one or more user-defined routing instructions. Further structure of the address book database will be discussed in connection with FIG. 2.

If the address book searching algorithm locates the originating number in the subscriber's address book database, the associated routing rule is forwarded to a routing system 140. The incoming call is then routed to call destination 160 based on the routing rule, and may be based on information obtained from calendar server 150 or presence server 170. If the address book searching algorithm does not find the originating number of the incoming call in the subscriber's address book database or finds that the originating number has no associated routing rule, a default routing rule, such as, "send the incoming call to voicemail", is forwarded to the routing system.

The incoming call also may be routed to the subscriber's present and/or desired destination based on information obtained from the calendar server or the presence server. The following types of information are contained within a calendar database or presence database associated with a respective server. The incoming call can be routed based on the date and time of the call in conjunction with information in the subscriber's calendar indicating an expected location (i.e., destination number) at a particular date and time. Further, when a subscriber makes use of a service that reports the subscriber's location and/or phone number to a server, that data, in turn, is made available for use by the dynamic selective call forwarding service through the presence server. For example, the subscriber's location may be indicated by data provided by an instant messaging client, or other client application, that actively connects to a server and continuously indicates location and/or contact number.

For example, some instant messaging service clients allow a user to configure a particular client installation with a location description and a phone number. This data is available to the user's "buddies." "Buddies" are a set of users of a communications system who are granted access to privileged information about the subscriber by the subscriber. For example, in instant messaging, when buddies hover their mouse over a user's name on a buddy list, privileged information is provided. Another example of a service having subscribers' location information is a cellular phone system, in which users' locations are known to the system based on the cell to which an individual user is currently connected or by other means (e.g., a GPS system integrated into the cellular network). An interactive cable TV set-top-box (STB) system is a further example of such a service. Once a user logs into a STB system, the user's buddies are automatically informed of the user's activity on the system (i.e., logged on watching television). In each of these examples and similar others not exhaustively listed, calendar and presence servers are in communication with the dynamic forwarding system of the invention to provide information required to selectively route an incoming call.

The routing system selectively routes the incoming call to the call destination, which can be the subscriber's home phone, office phone, cell phone, any other designated telephone number, voicemail or the like. The incoming call is routed in accordance with the address book database and associated routing rules, the subscriber's calendar information, and/or the subscriber's presence information. The routing system also may send one or more notifications of an incoming call to the subscriber through a page, an email, or an instant message. In this manner, the dynamic forwarding system routes incoming calls to the most appropriate destination, such as the subscriber's current location, based on the subscriber's preferred routing for calls originating from the calling party. A similar notification likewise may be sent to the calling party.

Figure 2:
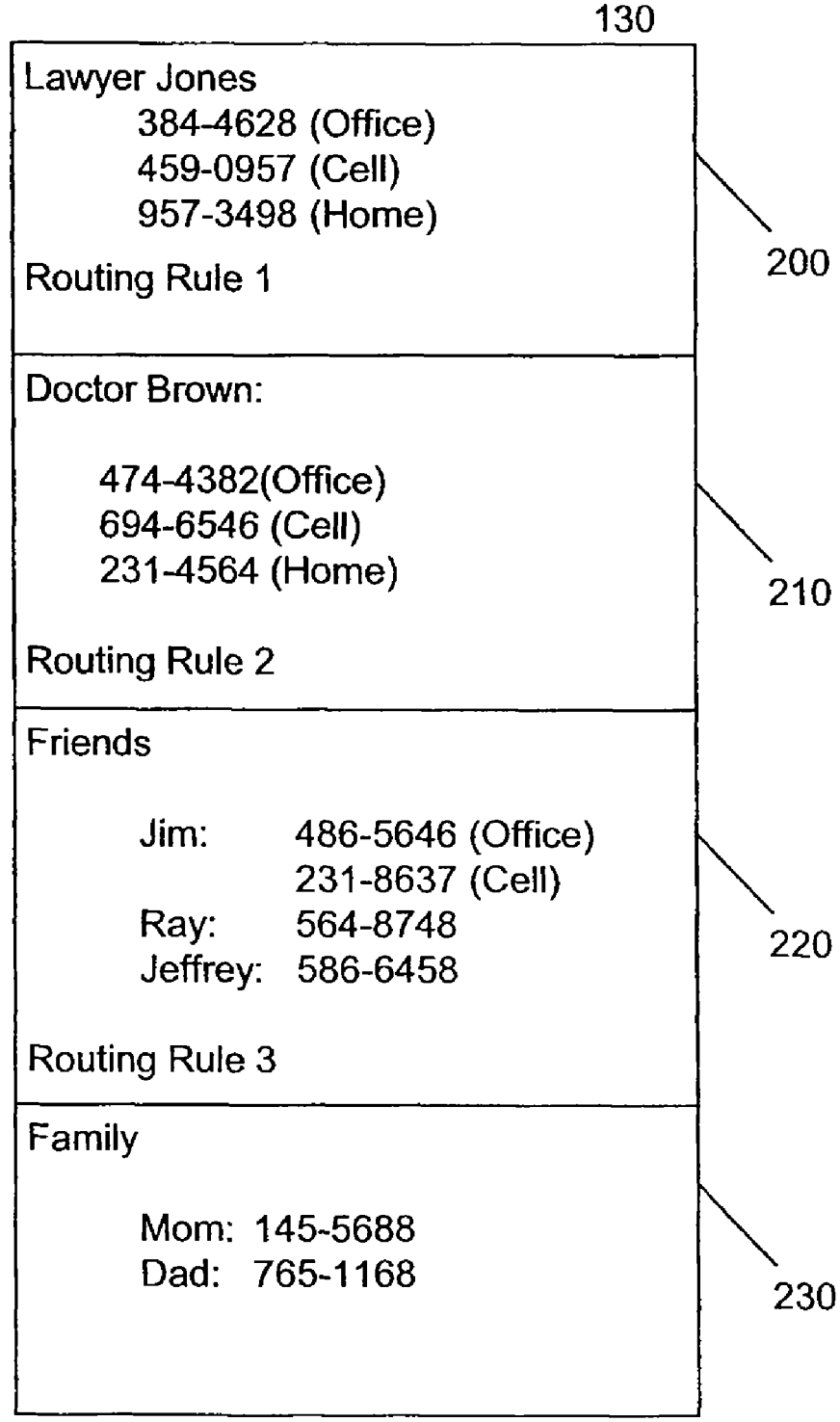
FIG. 2 is a diagram illustrating an exemplary address book database that is searched to determine the appropriate routing rules for an incoming call.

FIG. 2 is a diagram illustrating an exemplary subscriber entry in the address book database 130. Each entry has associated therewith one or more records (200, 210, 220, and 230). As previously mentioned, each record may have one or more telephone numbers. Each record also has an associated routing rule that determines the call destination for an incoming call originating from any telephone number corresponding to the entry. In the absence of a routing rule for a record, a default routing rule is utilized to route incoming calls.

For example, in FIG. 2, record 200 is assigned all of the phone numbers used by the subscriber's lawyer, Lawyer Jones. Routing Rule 1, which comprises one or more subscriber-defined routing instructions, is associated with the Lawyer Jones' record. The address book database is organized so that all calls from Lawyer Jones, regardless of whether made from Lawyer Jones' home, office or cellular phone, are routed in accordance with Routing Rule 1. In this manner, an applicable routing rule need not be duplicated for each of Lawyer Jones' telephone numbers.

Various database techniques known to those skilled in the art may be utilized to organize the information for each subscriber. For example, the term "entry" can refer to aggregate data from multiple records in several tables all concerning the same subscriber, with one table keeping a mapping of called telephone number and "subscriber ID" and another table mapping calling telephone number and "routing rule ID", indexed by "subscriber ID" and calling telephone number. A third table can map "routing rule ID" and routing instructions, indexed by "subscriber ID" and "routing rule ID" such that the tables are linked via the subscriber ID.

In the FIG. 2 illustration, record 210 is assigned to the subscriber's doctor, Doctor Brown, and is organized in a similar fashion to the record for Lawyer Jones. Record 220, assigned to the subscriber's "Friends", includes phone numbers associated with various persons. The "Friends" record is assigned to a group of people having a similar subscriber-assigned priority, and thus each person in the group shares the same routing rule. Record 230 is assigned to the "Family"

group and is organized in a similar fashion to record 220. However, the "Family" group does not include a routing rule and, in the absence of a routing rule, a default routing rule may be assigned. For example, incoming calls from Family members may be routed to voicemail by default. Each originating phone number may have a unique routing rule. The routing rules may be uniquely created by a subscriber. Additionally, a limited number of standard routing rules, such as "terminate normally" and "send to voicemail", may be provided.

In an alternative embodiment, the address book database for each subscriber has one record per originating party (i.e., one record for each last name, first name). Each record then contains fields for one or more originating phone numbers and a corresponding routing rule associated with each originating phone number.

Figure 3:
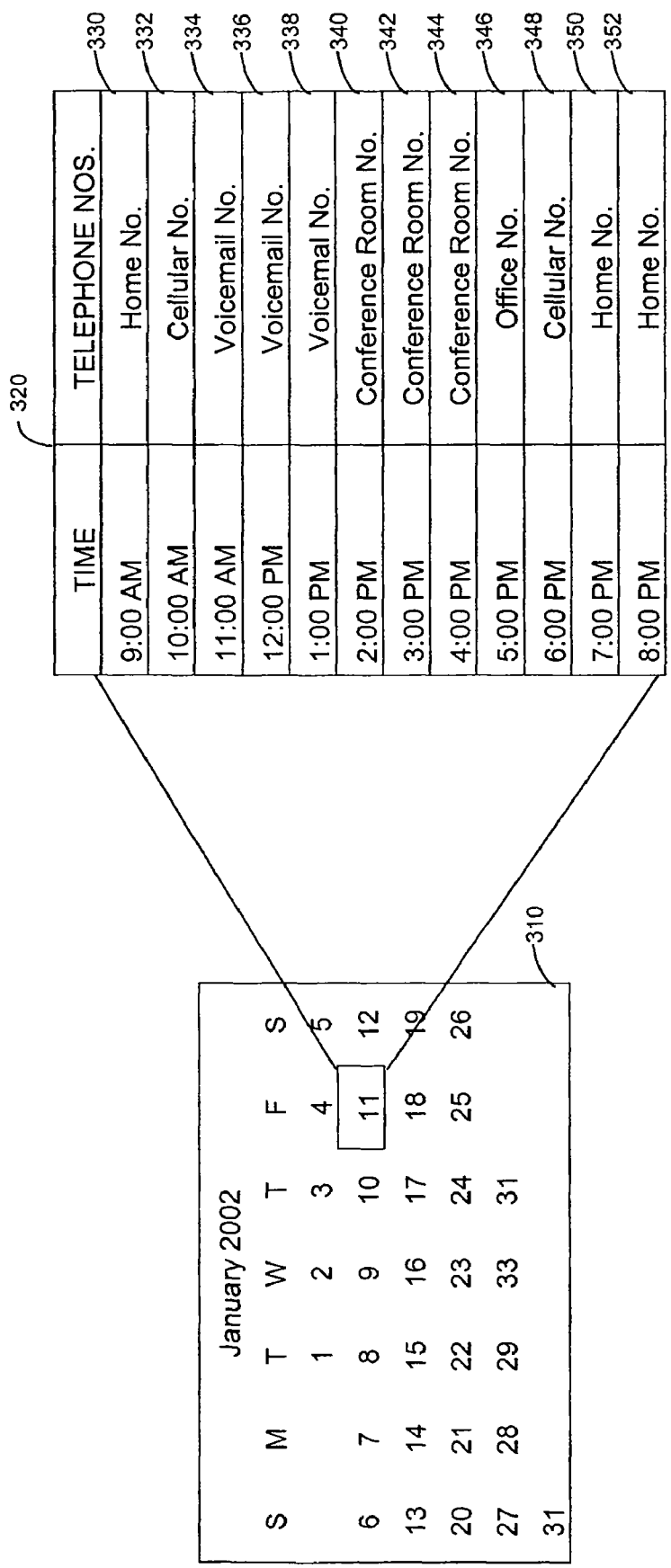
FIG. 3 is a diagram illustrating an exemplary calendar database for determining a routing destination based on the time and date of an incoming call.

FIG. 3 is a diagram illustrating an exemplary subscriber calendar database associated with the calendar server 150 for use in routing incoming calls. FIG. 3 also illustrates portions of an exemplary subscriber calendar interface. The subscriber calendar may include a calendar interface of any sort, including one or more daily, weekly, monthly, and/or yearly calendars. Displayed is a calendar 310 for a single month of a calendar year. However, various other interfaces for subscriber calendar data are well within the skill of one versed in the art of the invention.

As shown, each calendar day, for example, January 11$^{th}$, has an associated table 320 that subdivides the day into time slots. A time slot may be scheduled as a time interval of any duration; each time slot need not be of equal duration. Although the duration and number of time slots is variable, the illustrated embodiment has a particular number of time slots that divide the day into mostly hourly time slots.

Each time slot has associated a call destination number representing the location where the subscriber may be reached during the time indicated by the time slot. Thus, when a subscriber-defined routing rule includes routing of the incoming call in accordance with the subscriber's calendar, the dynamic forwarding system will route the incoming call to the call destination associated with the current time slot for the current day.

For example, if Routing Rule 1 associated with Lawyer Jones in the Address Book Database record 200 specifies routing incoming calls based on the subscriber's calendar, an incoming call is routed to a destination telephone number scheduled in the calendar for the current date and time. For purposes of illustration, assume that a subscriber typically leaves home at 10:00AM and has established the date and time destination routing shown in FIG. 3. Calls prior to 9:00AM and between 9:00AM and 10:00AM are directed to the subscriber's home phone, as indicated in field 330 of calendar 320. During the time the subscriber commutes to work between 10:00AM and 11:00AM, calls are routed to a cell phone, as indicated in field 332. Between 11:00AM and 2:00PM, the subscriber prefers that incoming calls be directed to voicemail, as indicated in fields 334, 336, and 338. Between 2:00PM and 5:00PM, the calendar indicates routing of incoming calls to a conference room telephone during a meeting the subscriber has scheduled, as indicated in fields 340, 342, and 344. Between 5:00PM and 6:00PM, incoming calls are again to be routed to the subscriber's office phone, as indicated in field 346. From 6:00PM to 7:00PM, during the subscriber's commute from office to home, calls are once again to be routed to the subscriber's cell phone, as indicated in field 348. After 7:00PM and for the remainder of the calendar day, the subscriber, expecting to have returned home, has once again directed that all incoming calls be routed to the home phone, as indicated in fields 350 and 352.

FIG. 4 is a table illustrating exemplary subscriber records in the presence database associated with the presence server according to one embodiment of the invention. Each subscriber record has three fields: a client field 410, a telephone number field 420, and a presence indicator field 430. The client field 410 contains an instance for each subscriber logged on to a client application. The client application communicates with the presence server and provides the subscriber's destination phone number and presence information. Examples of such client applications include instant messaging, set-top-box, and cellular telephone systems. The telephone number for the subscriber's location, as provided by the client application, is stored in field 420. The presence indicator field 430 indicates the user presence at the destination location (i.e., whether the subscriber is currently accessing that client application). The client field and the presence indicator field may be one and the same field in one alternative embodiment.

When the dynamic selective call forwarding system processes a subscriber-defined routing rule that requires routing of an incoming call according to a subscriber's present location, the system will route the incoming call to the telephone number provided by the client application that the subscriber is currently accessing. If the subscriber is not currently accessing a client application, the system will route the incoming call in accordance with other subscriber-defined routing instructions in the routing rule. If no other subscriber-defined routing instructions are defined in the routing rule, the incoming call will be routed according to a default routing rule to a default destination, such as voicemail.

Figure 5:
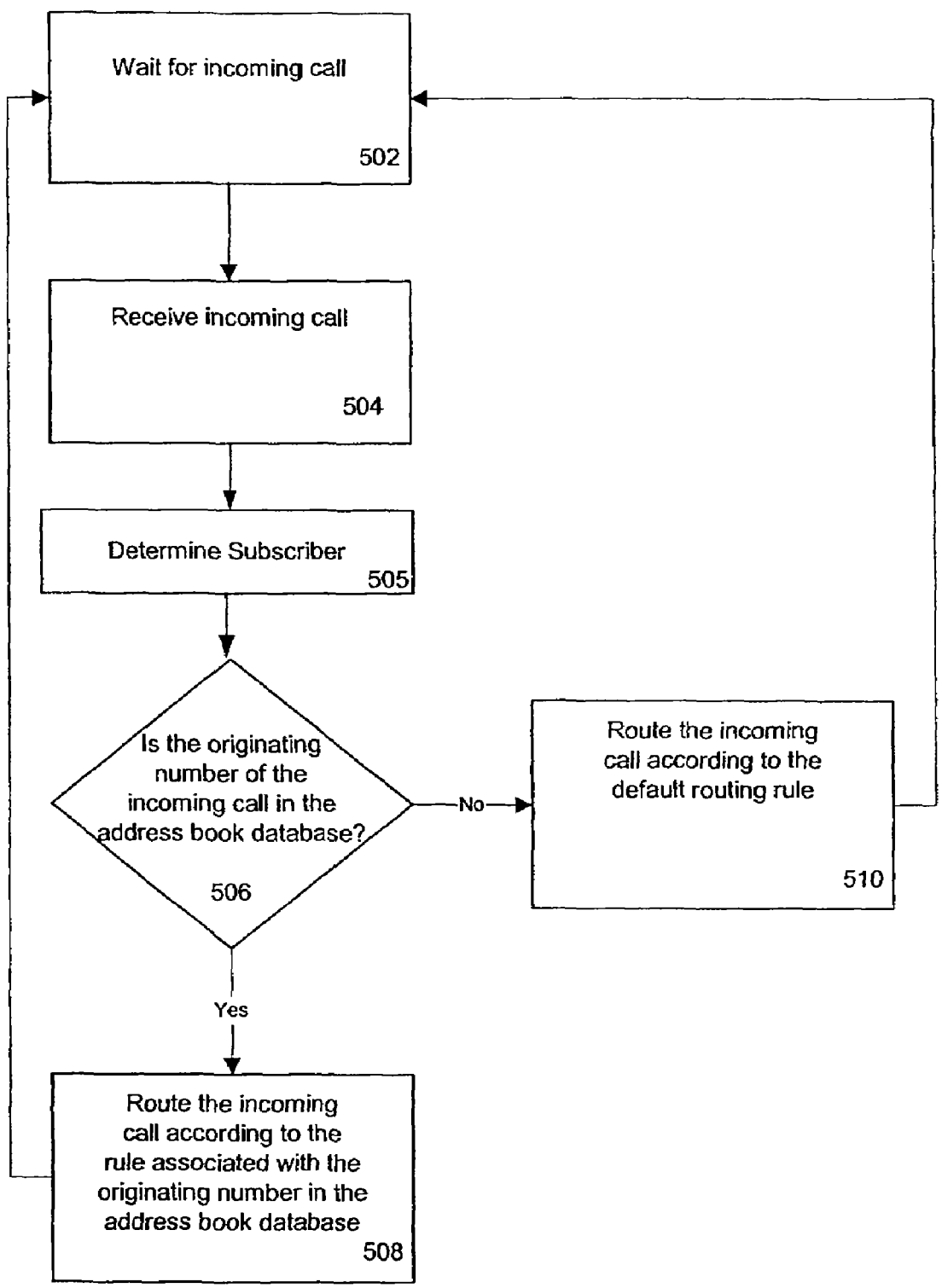
FIG. 5 is a flowchart depicting an exemplary operation of the invention.

FIG. 5 is a flowchart depicting exemplary operation of an embodiment of the dynamic selective call forwarding system. In step 502, the system waits for an incoming call destined to a subscriber's telephone number. In step 504, such an incoming call is received. In step 505, the dialed number is used to determine the subscriber to which the incoming call is directed. The address book database 130 is then searched for the subscriber's entry in step 506 and it is determined if the originating number associated with the incoming call matches a telephone number in the subscriber's records. If a match is determined, the routing rule associated with the originating number is retrieved and the incoming call is forwarded to the routing system at step 508 for routing in accordance with the routing rule. If a match is not detected, the incoming call is completed to the dialed destination number according to a default routing rule at step 510. The system then waits for the next call to a subscriber at step 502.

Figure 6:
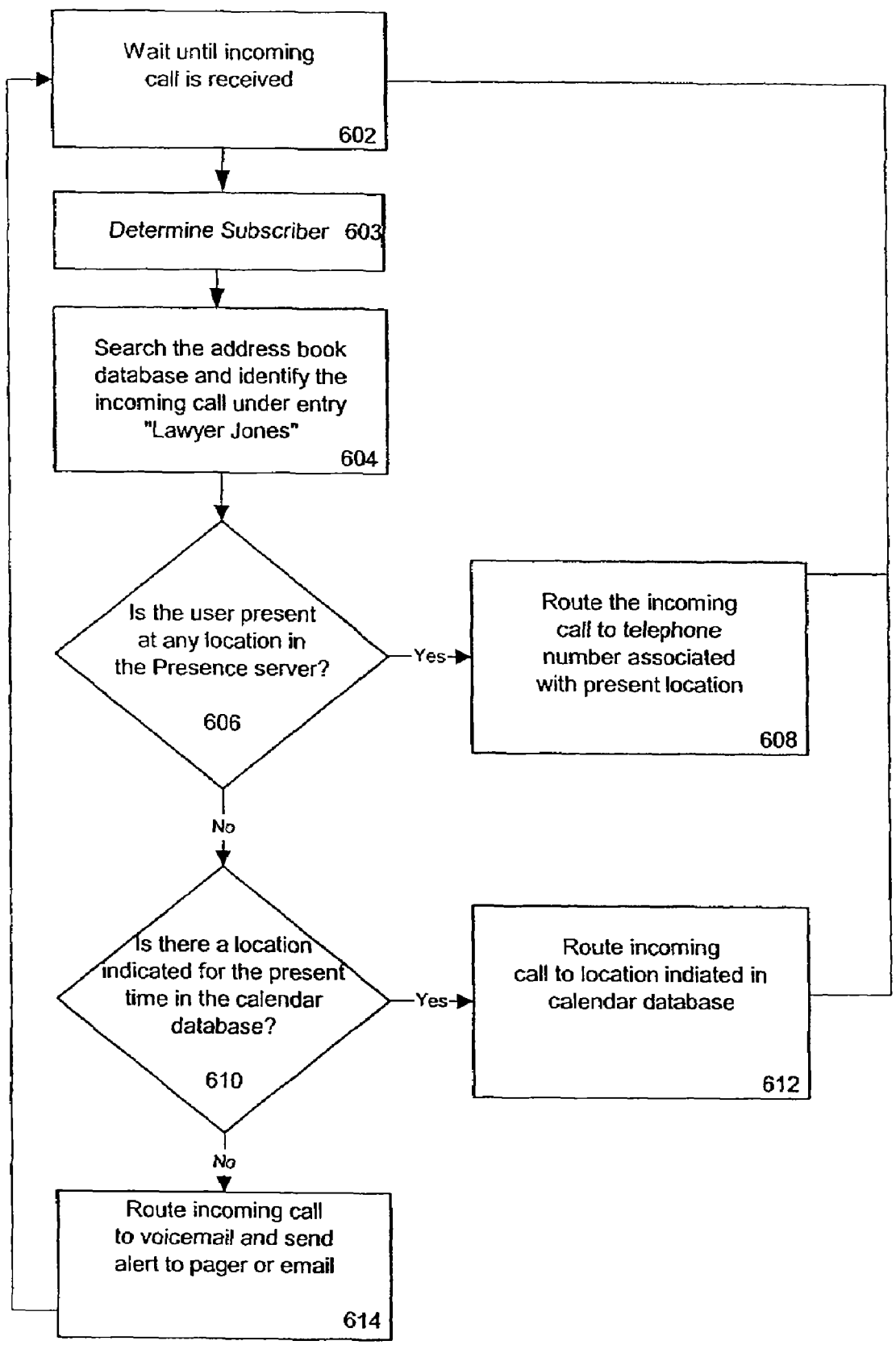
FIG. 6 is a flowchart depicting an exemplary operation of the invention according to a set of subscriber-defined routing instructions.

FIG. 6 is a flowchart depicting exemplary operation of the dynamic selective call forwarding system according to an exemplary subscriber-defined routing rule. The system waits at step 602 until an incoming call is received for the subscriber from Lawyer Jones. In step 603, the dialed number is used to determine to which subscriber the incoming call is directed and the subscriber's address book. The address book searching algorithm 120 matches the originating number of the incoming call with a telephone number in the subscriber's records of address book database 130 in step 604. The routing rule for Lawyer Jones is retrieved and the incoming call is then forwarded to the routing system for routing according to the Routing Rule 1, assigned to Lawyer Jones in FIG. 2. Routing Rule 1 may include a number of routing instructions, for example:

First, route the incoming call to a call destination associated with an active client application. Second, if no client application is active, route the incoming call according to the subscriber calendar. Third, if no call destination is specified in the subscriber calendar, route the call to voicemail.

Thus, in step 606, the routing system first utilizes the presence server to search the presence database and determine if the subscriber is currently active on a client application. If there is an active client application, at step 608 the incoming call is routed to the telephone number associated with the active client application. If there is no active client application or the client application has no telephone number for the subscriber, the routing system in step 610 utilizes the calendar server to search the calendar database for a time slot that corresponds to the current date and time and determines whether the subscriber has identified a call destination for that time slot. If there is a call destination associated with the current time slot, then the incoming call is routed to that call destination in step 612. If there is no call destination associated with the current time slot, then the incoming call is routed to a voicemail system in step 614. The subscriber may also be notified of the voicemail message via a page, an email message, an instant message, or the like.

Figure 7:
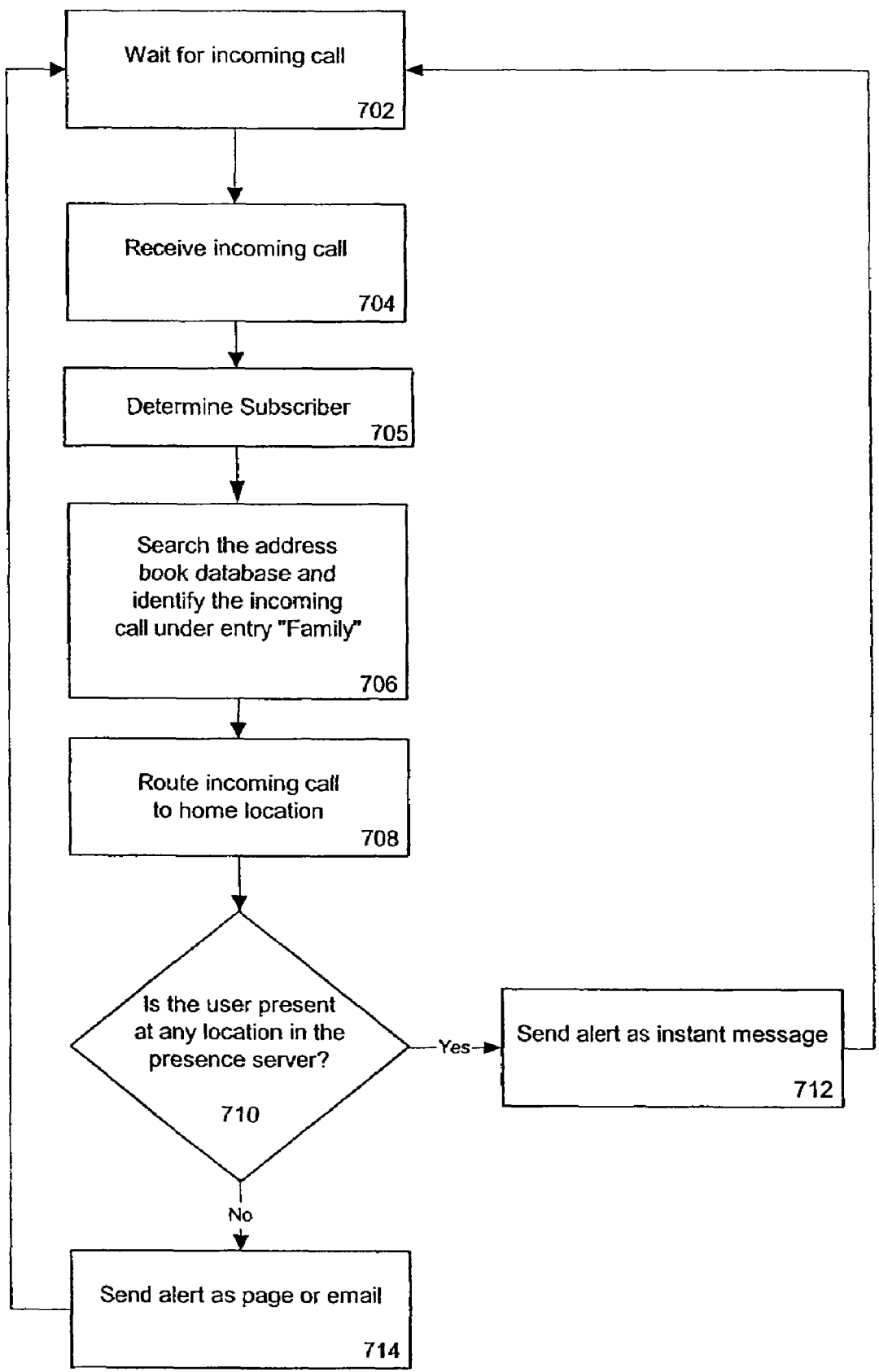
FIG. 7 is a flowchart depicting an exemplary operation of the invention according to a second set of subscriber-defined routing instructions.

FIG. 7 is a flowchart depicting exemplary operation of the dynamic selective call forwarding system according to a default routing rule defined by a subscriber. The system waits at step 702 for an incoming call for the subscriber and the incoming call is received at step 704. In step 705, the dialed number is used to determine the subscriber to which the incoming call is directed. In step 706, the address book searching algorithm 120 matches the originating number of the incoming call with a telephone number in the subscriber's records in the address book database 130. For illustrative purposes, the incoming call originates from a family member of the subscriber and matches a telephone number in the "Family" record shown in FIG. 2. According to the address book database in FIG. 2, there is no subscriber-defined routing rule associated with the Family entry. Therefore, the incoming call is forwarded to the routing system for routing according to a default routing rule. The default routing rule may include the following subscriber-defined routing instructions:

First, route the incoming call to the home phone. Second, send an instant message to an active client application indicating a call has been routed to the home phone. Third, if no client application is active, send a page or email indicating a call has been routed to the home phone.

The routing system routes the call to the home phone of the subscriber in step 708 according to the subscriber-defined routing rule, in this case regardless of whether the subscriber is presently at home. The routing system then searches the presence server at step 710 to determine if the subscriber is active on a client application. If the subscriber is active on a client application, then a notification that a call has been received at the subscriber's home phone is sent as an instant message via the client application at step 712. If not currently active, then a notification is sent as a page or email at step 714. The notification may include data from the address book, the date and time of the incoming call, the originating telephone number and various other information of interest to the subscriber.

It should be noted that the flowcharts of FIGS. 6 and 7 illustrate exemplary routing rules that may be employed by a subscriber. However, numerous other routing rules may be readily created and employed by a subscriber and require the issuance of control commands to various devices that communicate with the subscriber. It is therefore contemplated that the dynamic selective call forwarding service is able to issue control commands to these various devices.

While certain preferred embodiments of the invention have been illustrated for the purpose of this disclosure, numerous changes in the arrangement and construction of constituent elements may be made by those skilled in the art, which changes are embodied within the scope and spirit of the present invention as defined by the appended claims.

What is claimed is:

1. A method for selectively forwarding an incoming call over a Public Switched Telephone Network (PSTN), the method comprising:
   receiving the incoming call;
   identifying the incoming call by originating number, wherein identifying comprises determining whether the originating number is associated with a subscriber-defined group;
   retrieving a subscriber-defined routing rule associated with the originating number of the incoming call, wherein the subscriber-defined routing rule is based on said subscriber-defined group; and
   routing the call over the PSTN according to subscriber-defined information including the subscriber-defined routing rule.

2. The method of claim 1, wherein the step of retrieving comprises:
   matching an originating number of the incoming call with a contact number in a database.

3. The method of claim 1, wherein the step of retrieving comprises:
   retrieving the subscriber-defined routing rule from a database.

4. The method of claim 1, wherein the subscriber-defined information comprises:
   a contact number,
   the subscriber-defined routing rule associated with the contact number,
   a destination number,
   a destination number associated with a time period,
   a destination number associated with a subscriber presence on a client application, or
   any combination thereof.

5. The method of claim 4, wherein the destination number is a home telephone number, a cellular telephone number, an office telephone number, a voice mail telephone number, or any other phone number.

6. The method of claim 1, wherein the step of routing comprises:
   routing the incoming call to a destination number,
   routing the incoming call to a destination number associated with a current time period,
   routing the incoming call to a destination number associated with a subscriber presence on a client application, or
   any combination thereof.

7. The method of claim 1, further including the step of:
   identifying the incoming call as being directed to a subscriber.

8. The method of claim 1, wherein the subscriber-defined information comprises at least one subscriber entry including one or more records in one or more tables, each record comprising:
   at least one contact number; and
   a subscriber-defined routing rule associated therewith.

9. The method of claim 1, wherein the subscriber-defined routing rule is a default routing rule.

10. The method of claim 1,
wherein the subscriber-defined routing rule comprises a routing instruction comprising at least one of:
route the incoming call to a called number,
route the incoming call according to subscriber calendar information,
route the incoming call according to subscriber presence information,
route the incoming call to a voicemail system,
route the incoming call to a messaging system,
forward a message to a calling party,
forward a notification to the subscriber, and
disconnect the incoming call; and
wherein the notification is performed using at least one of:
a telephone service,
an email service,
a paging service,
a messaging service, or
an instant messaging service.

11. The method of claim 10, wherein one or more routing instructions are performed until the incoming call is forwarded to a destination according to the subscriber-defined information.

12. The method of claim 10, wherein the subscriber calendar information comprises:
at least one time slot; and
an associated destination number.

13. The method of claim 10, wherein the subscriber presence information includes at least one of:
a client application identifier,
a destination number associated with a client application, or
an indicator of whether a subscriber is currently using a client application.

14. A system for selectively forwarding an incoming call, the system comprising:
a receiver operative to receive the incoming call;
a database comprising subscriber-defined information including at least one contact number and at least one routing rule associated with the at least one contact number;
a search unit for determining from the database a first routing rule corresponding to an originating number of the incoming call, wherein the first routing rule is based on a subscriber-defined group associated with the originating number of the incoming call; and
a routing unit for routing the incoming call via a Public Switched Telephone Network (PSTN) according to the first routing rule.

15. The system of claim 14, wherein the subscriber-defined information further comprises:
a destination number,
a destination number associated with a time period,
a destination number associated with a subscriber presence on a client application, or
any combination thereof.

16. The system of claim 14, wherein the receiver is further operative to identify the incoming call as being directed to a subscriber.

17. The system of claim 14, further comprising:
a calendar database of subscriber calendar information including
at least one time slot; and
an associated destination number.

18. The system of claim 14, further comprising:
a presence server providing subscriber presence information including at least one of:
a client application identifier,
a destination number associated with a client application, or
an indicator of whether a subscriber is currently using a client application.

19. A system for selectively forwarding an incoming call, the system comprising:
an address book database including at least one contact number and at least one routing rule associated with the at least one contact number;
an incoming call identification unit operative to identify an originating number of the incoming call, wherein the originating number is associated with a subscriber-defined group;
an address book search algorithm operative to determine a first routing rule corresponding to the originating number, wherein the first routing rule is based on said subscriber-defined group;
a calendar server including at least one time slot and an associated destination number;
a presence server including at least one client application identifier and an associated destination number; and
a routing unit operative to route the incoming call over a Public Switched Telephone Network (PSTN) to a destination number determined by the first routing rule.

20. The system of claim 19, wherein the incoming call identification unit is further operative to identify the incoming call as being directed to a subscriber.

* * * * *